J. C. THOMPSON.
PROPORTIONAL MEASURING INSTRUMENT.
APPLICATION FILED DEC. 29, 1905. RENEWED JAN. 10, 1910.
967,267.
Patented Aug. 16, 1910.
2 SHEETS—SHEET 2.
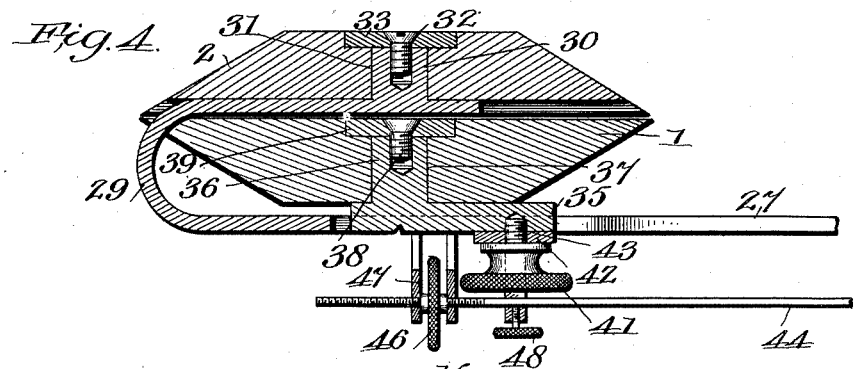
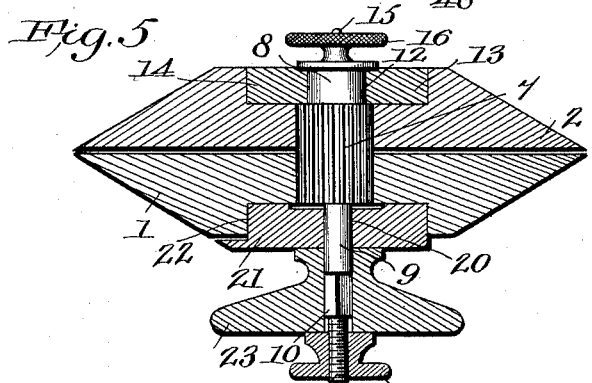
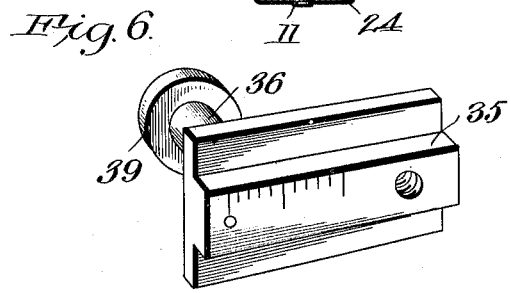
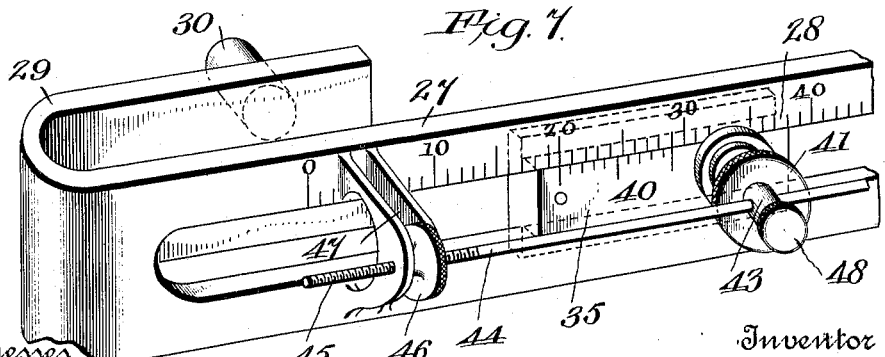

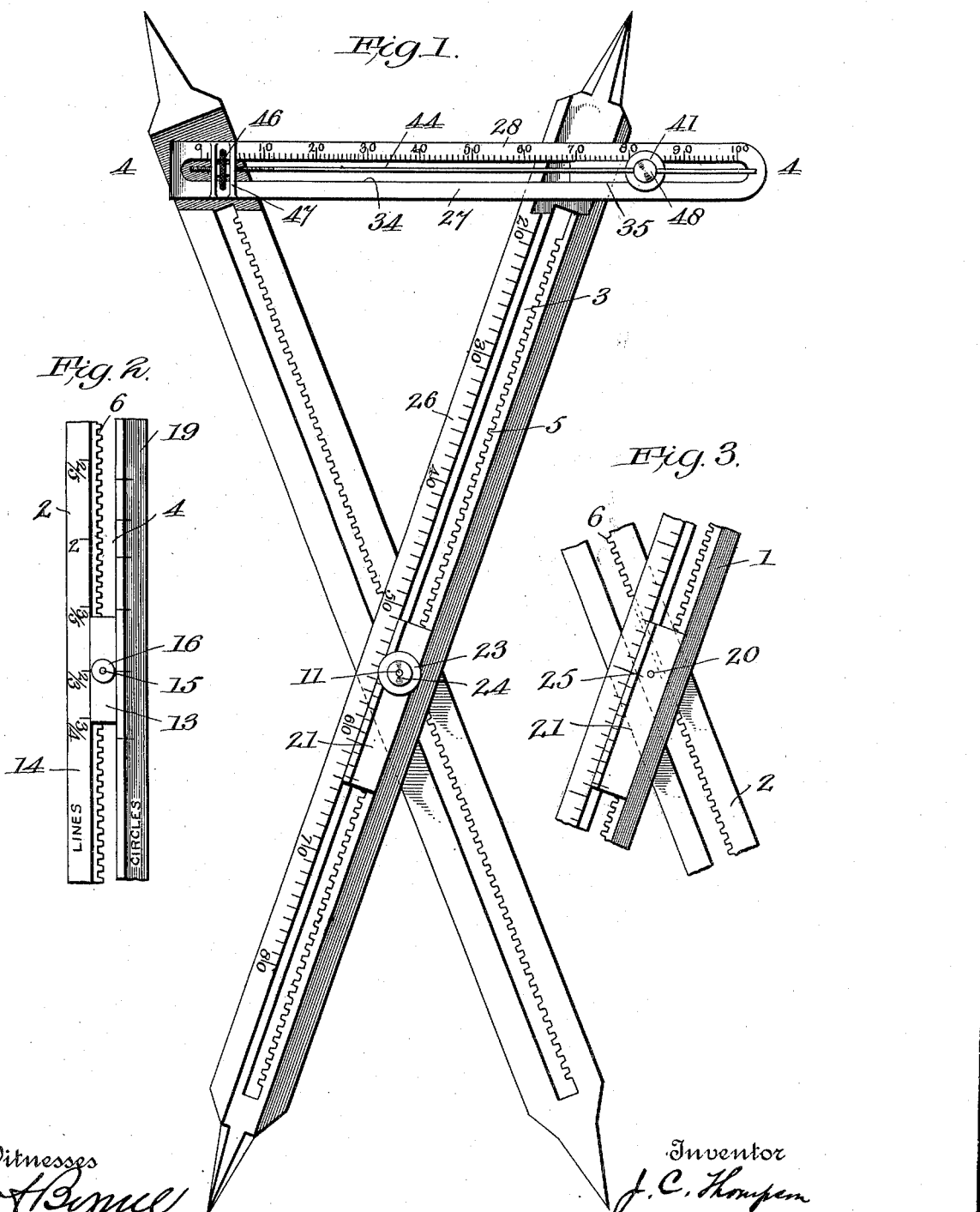

UNITED STATES PATENT OFFICE.

JOSEPH C. THOMPSON, OF PROVIDENCE, RHODE ISLAND, ASSIGNOR TO KARL K. BOSSE, OF NEW YORK, N. Y.

PROPORTIONAL MEASURING INSTRUMENT.

967,267.  Specification of Letters Patent.  Patented Aug. 16, 1910.

Application filed December 29, 1905, Serial No. 293,869. Renewed January 10, 1910. Serial No. 537,340.

*To all whom it may concern:*

Be it known that I, JOSEPH C. THOMPSON, a citizen of the United States, residing at Providence, in the county of Providence and State of Rhode Island, have invented a new and useful Improvement in Proportional Measuring Instruments, of which the following is a specification.

This invention relates more particularly to that class of measuring instruments known as proportional dividers, and the object of the invention is to facilitate the operation of comparing linear dimensions and dividing lines proportionally, adding to a line a given proportion of the length of the line itself, the instantaneous conversion from measurements of one standard, such as inches, to another, such as meters and vice versa, and for various other operations for which instruments of this kind may be used.

I accomplish the object of my invention by combining with the legs of a proportional divider an adjustable arm which forms a permanent base line for one of the triangles formed by the said divider legs, and providing this arm with a scale and movable index whereby the instrument is made direct reading.

In order to more fully describe my invention, reference will be had to the accompanying drawings, which illustrate a form thereof and wherein:

Figure 1 represents the proportional divider in front elevation with legs opened; Fig. 2, a front elevation of a portion of one of the legs to show an arrangement of scales; Fig. 3, a fragmentary side elevation of the divider legs to more clearly show the arrangement of the vernier and one of the scales operating in conjunction therewith; Fig. 4, an enlarged sectional detail view taken along the line 4—4, Fig. 1, with the divider legs closed; Fig. 5, an enlarged sectional view taken along the line 5—5, Fig. 1, with the divider legs closed; Fig. 6, an enlarged detail perspective view of the follower carrying the vernier for the base line scale; and Fig. 7, an enlarged perspective view of one end of the base line scale and micrometer for operating its vernier.

In the accompanying drawings 1 and 2 represent the legs of the instrument, each of which is preferably pointed at both ends. The legs of the instrument are held together by means of a pivot connection which may be of any of the several well known kinds. In the form of the instrument shown, the legs are each slotted longitudinally as at 3 and 4, respectively, and these slots are each provided with a rack, these racks 5 and 6 being on corresponding sides of said slots. The fulcrum or pivot of the divider legs consists of a small pinion 7 meshing with the racks 5 and 6 and having at one end a stud 8 and at the other end a spindle 9, both stud and spindle being integral with or otherwise made fast to said pinions. The spindle is squared as at 10, and terminates in a screw threaded end. The stud 8 engages an opening 12 in a block 13 adapted to fit and slide in a channel 14 formed on one of the faces of the leg 2 and extending preferably the length of the slot 4. This stud 8 terminates in a screw threaded spindle 15 which carries a milled thumb nut 16. The block 13 may be provided with an index point to operate in conjunction with ordinary proportional divider scales 18 and 19 on the leg 4, the scale 18 being for lines and the scale 19 for circles, as in some forms of proportional dividers. These scales may be used when the instrument is employed as an ordinary proportional divider, and are entirely independent of the base line scale employed in my invention.

The spindle 9 of the pinion 7 extends through and fits an opening 20 in the block 21, which latter fits into and is adapted to slide in a channel 22 in the face of the leg 1 and extending preferably the length of the slot 3. Fitting over the squared portion 10 of the spindle 9 and prevented thereby from rotation on said spindle, is a milled nut 23 locked thereagainst by a milled locking nut 24.

The block 21 carries upon its outer face an index, preferably in the form of a vernier 25 (see Fig. 3), and this vernier is adapted to coöperate with a scale 26 on the outer face of the leg 1. This scale is laid off into divisions which divide the total length of the divider leg into tenths, twentieths and hundredths. By means of the vernier this scale may be made to read to thousandths.

To shift the pivotal connection between the legs and therefore alter the proportion of the measurements, lock nuts 15 and 24 are loosened and the nut 23 turned. The pinion 7, which forms the fulcrum or pivot will then travel in either direction, depending upon the direction in which the nut 22 is turned. When the proper adjustment is secured, the pinion may be locked in the desired position by tightening lock nuts 15 and 24. The legs, however, will be permitted to open and shut in the usual manner.

I do not claim as new the specific form of pivot connection just described, nor the arrangement of the scale and vernier on the leg.

The parts of the instrument thus far described in detail do not differ essentially from those of well known forms of proportional dividers, and such parts may be used for all purposes for which ordinary proportional dividers may be used.

My invention consists in combining with the parts of the well known proportional divider, other parts, by means of which combination an instrument is produced which will accomplish all that may be accomplished by the usual form of instrument and a great deal more. To accomplish this, I take advantage of the well known principle of the proportional divider that the base lines of the two similar triangles formed by the legs on opposite sides of the pivot connecting said legs are proportional and that the proportion of these lines varies directly as the distance from the pivotal point to the ends of the legs. In other words, the bases of the two triangles vary in exact ratio as the altitudes. In doing this I provide the instrument with an adjustable arm forming a permanent base line for one of the triangles, and lay off on this arm a scale by which the proportion of the base lines of the two triangles may be read directly. In the form shown, this arm consists of a preferably thin metallic strip 27, having a scale 28 thereon, the scale shown being divided into one hundred divisions. The arm 27 is bent upon itself as at 29 (see Figs. 4 and 7) and carries near such end a stud 30, which extends into and fits an opening 31 in the leg 2. This stud forms a pivotal support for the scale arm 27 and is held in place by a screw 32 passing through a washer 33 countersunk in the leg 2. It is essential that the pivot 30 be in a direct line with the center line of the pivot connecting the legs. The stud 30 is loosely mounted in the opening 31 to allow the arm 27 angular movement.

The scale arm 27 is slotted longitudinally as at 34 and in this slot is adapted to travel the follower 35 which is pivoted to the arm 1, and for this purpose is provided with a cylindrical stud 36 which fits into and turns in an opening 37 passing through the leg 1. A screw 38 passing through a washer 39 countersunk in the leg 1 holds the stud 36 in position.

The follower 35 may be provided with any suitable index, such for example as the vernier 40, and may be clamped in position by means of a milled nut traveling on a screw threaded stud 43 secured to the follower. For fine adjustment the follower 35 may be provded with a micrometer adjustment. In the case shown, this consists of a rod 44, screw threaded at one end at 45, where it engages a milled nut 46 mounted to turn between two supports 47 made fast to the scale arm. The other end of the rod 44 passes through an opening in the stud 43 where it may be clamped by a milled set screw 48. Obviously by loosening set screw 48, the coarse adjustment of the index may be effected by moving the follower with the hand, after which the finer adjustment may be effected by turning the nut 46. It is important that the zero point of the index on the follower 40 coincide exactly with the center of the pivot 36 forming the connection between the scale arm and the leg 1 and also with the center point of its pivot in a direct line with the center of the pivot connecting the two legs of the instrument.

As an example of some of the uses to which this instrument may be put, let it be required to divide a given line into the proportion of 34 to 66. The zero mark of the index of the base line scale 28 would be set to coincide with the one hundred division on said scale. The follower 35 is then locked by means of the milled nut 41 and the points of the free ends are then adjusted by adjusting the pivot connecting the legs until the distance between such points is equal to the length of the line to be divided. The adjustable pivot connecting said legs is then secured against longitudinal movement thereon by the lock nuts 15 and 24, and the lock nut 41 of the base line scale is loosened and the follower 35 slid along until the zero of its index coincides with the division 66 on the base line scale 28. The points at the ends of the legs opposite the base line scale will then embrace a distance equal to sixty-six one-hundredths of the total length of the line. By means of the vernier 40, proportions may be read into thousandths according to the well known principle of the vernier. Obviously, to add a certain proportion to a given line, the procedure would be just the same as above described.

To compare the relative length of two lines, the index of the base line scale is set with its zero opposite the 100 division of the said scale, as above described, and the movable pivot connecting the legs of the instrument is adjusted until the free ends of the legs cover the length of the longer of the two lines, when the said pivot is clamped in position. The index on the base line scale is then moved along the said scale until the points at the free ends of the divider legs cover the length of the shorter of the two lines, whereupon the proportion of one of these lines to the other can at once be read off the base line scale. For example, if the index on said scale should be opposite the division 73 when the points of the free ends of the divider legs cover the length of the shorter line, then the proportion of the two lines would be exactly as 100 is to 73. Obviously, any number of lines may thus be compared. It will therefore be seen that with such an instrument the scale relation between drawings may be readily determined by comparing, as above set forth, the length of a given line in one drawing with that of a corresponding line in the other drawing.

Having thus described a form of my invention, what I claim is:

1. A proportional measuring instrument having two divider legs, a pivot connecting said legs and adjustable longitudinally thereon, an arm pivoted to one of said legs, a pivot carried by the other of said legs adapted to be secured against lateral movement in various positions along said arm, the said pivot when secured in any of said positions permitting the adjustment of the pivot connecting said legs to effect a change in the proportion of the bases of the two triangles whose apices terminate in said pivot connecting said legs and to simultaneously vary the length of one of said bases only.

2. A proportional measuring instrument comprising a pair of divider legs, a pivot connecting said legs and adjustable longitudinally thereon, an arm pivoted to one of said legs, a scale on said arm, an index carried by the other leg, and means to secure said index in different positions along said scale, the adjustment of said index permitting at all times the angular movement of the leg to which it is secured.

3. A proportional measuring instrument having two divider legs, a pivot connecting said legs and adjustable longitudinally thereof, a scale along one of said legs, an index carried by said adjustable pivot and adapted to coöperate with said scale, a slotted arm pivoted to said leg in line with said adjustable pivot, a follower adapted to travel in said slot and pivoted to the other of said legs, a scale upon said arm, an index for said scale carried by said follower, and means to clamp said follower in various positions along said scale, the pivot of said follower allowing at all times an angular movement of the leg connected thereto, the adjustment of said follower on said scale and the adjustment of the pivot connecting the said legs being independent.

JOSEPH C. THOMPSON.

Witnesses:
K. K. BONE,
E. A. FALLER.